United States Patent [19]

Vezirian

[11] 4,350,060
[45] Sep. 21, 1982

[54] METHOD OF MAKING A ROTARY ROCK BIT

[75] Inventor: Edward Vezirian, Irvine, Calif.

[73] Assignee: Smith International, Inc., Newport Beach, Calif.

[21] Appl. No.: 180,595

[22] Filed: Aug. 25, 1980

Related U.S. Application Data

[62] Division of Ser. No. 3,246, Jan. 15, 1979, Pat. No. 4,266,622.

[51] Int. Cl.³ .............................................. E21B 9/10
[52] U.S. Cl. ................................................ 76/108 A
[58] Field of Search ............... 175/366, 367, 368, 369, 175/371, 375; 76/101 E, 108 A; 308/8.2

[56] References Cited

U.S. PATENT DOCUMENTS

| | | | |
|---|---|---|---|
| 1,306,694 | 6/1919 | Hughes | 175/368 |
| 2,038,388 | 4/1936 | Sherman | 175/369 |
| 2,091,193 | 8/1937 | Cox | 175/369 |
| 2,094,856 | 10/1937 | Smith et al. | 175/369 |
| 2,490,151 | 12/1949 | Noble et al. | 308/8.2 |
| 3,239,431 | 3/1966 | Knapp | 175/369 |
| 3,850,256 | 11/1974 | McQueen | 175/356 |
| 4,043,411 | 8/1977 | Lichte | 175/369 |
| 4,098,150 | 7/1978 | Penny et al. | 175/368 |
| 4,127,043 | 11/1978 | Evans | 175/369 |
| 4,145,094 | 3/1979 | Vezirian | 76/108 A |
| 4,157,122 | 6/1979 | Morris | 76/108 A |

FOREIGN PATENT DOCUMENTS 283748  1/1965  Netherlands .................. 308/8.2

*Primary Examiner*—Roscoe V. Parker
*Attorney, Agent, or Firm*—Robert M. Vargo

[57] ABSTRACT

A method of making a rotary rock bit is described comprising the steps of forming a one piece bit body having at least two legs extending downwardly therefrom, drilling a bore through each leg, providing a cone cutter for each leg, positioning each cone cutter to be aligned with the bore of a respective leg, inserting a separate journal pin through the bore of each leg until a portion extends into the cavity of the registering cone cutter, providing a thrust element into the cavity of each cone cutter and retaining it therein to form subassemblies, and securing each journal pin to the bore of the respective leg.

10 Claims, 5 Drawing Figures

METHOD OF MAKING A ROTARY ROCK BIT

This is a division of application Ser. No. 003,246, filed Jan. 15, 1979, now U.S. Pat. No. 4,266,622.

BACKGROUND OF THE INVENTION

1. Field of the Invention

The present invention relates generally to earth boring rotary rock bits and, more particularly, to rock bits having one piece bit bodies.

2. Description of the Prior Art

A rotary rock bit usually is manufactured from a plurality of subassemblies. Each subassembly comprises mainly a leg having a journal pin formed on the lower extremity thereof. A cone type cutter is rotatively supported on the journal pin and is usually retained thereon by a plurality of ball bearings. Fluid nozzles and self-contained lubrication systems are also contained within each leg. The leg subassemblies are then welded together to form a bit body.

A serious shortcoming with rock bits made in this manner is that a true geometry bit is practically impossible to manufacture. Because of the tolerance buildup in each of the subassemblies and because of the final welding process of the three legs, unwanted bit skew is incorporated into the final product. Moreover, the cone heights of the assembled products are not always the same. In addition, the journal offset and angle are not accurately held using the conventional assembly techniques.

Another problem with manufacturing rock bits from leg subassemblies is that many additional steps are required in the process. First of all, the leg seams must be machined with a 120° milling machine, and dowel holes must be drilled. Moreover, the journal pin bearing surfaces must be machined and having the journal pins integral with the legs makes the machining operation lengthy and cumbersome. In addition, the bearing surfaces of each journal pin must necessarily be carburized while the rest of the leg surface be painted over to prevent the remaining surface from being curburized. However, carbon leakage does occur on this surface and this leakage is deleterious to the subsequent operations of the legs.

Because of the problems associated with the above-mentioned leg subassemblies, one piece bit bodies have been proposed. Also, separate journal pins have been proposed in order to carburize and machine the pins prior to assembling them to the legs.

U.S. Pat. No. 4,043,411 shows one method of having a separate journal pin secured to a leg. However, the shortcoming found in the method of manufacture of the rock bit legs of the referenced patent is that the welding is accomplished on the interior side of the leg, i.e., the cutter receiving surface side of the leg. Such a method of manufacture severely restricts the design capabilities of the journal pin. Moreover, with such a restriction, the cone cannot be preassembled with the journal pin prior to welding the pin to the leg and may require secondary operations to clean welded areas prior to final assembly.

Another U.S. Pat. No. 4,098,150 also discloses separate journal pins. However, the structure disclosed therein does not lend itself to a one piece bit body construction.

U.S. Pat. No. 3,850,256 discloses a modified one bit body construction; however, very few of the problems discussed above are solved with the structure disclosed therein.

SUMMARY OF THE INVENTION

The present invention obviates the above-mentioned shortcomings by providing a rotary rock bit having structure and a method of assembly that lends itself to a one piece bit body. Briefly summarizing, the present invention pertains to a one piece bit body having a plurality of legs integrally formed thereon. A separate journal pin is provided to extend through a bore formed in each of the legs. A cone type cutter, along with a cone retention member, is mounted on each journal pin. In assembly the cone cutters and retention members are placed with the legs of the bit body in their operating positions. The journal pins are then inserted through the leg bores until they fully extend into the cavities of the respective cutters and are secured thereto.

An important advantage of the present invention is that the one piece bit body provides a true geometry bit. As a result, unwanted bit skew is eliminated, the cone height can be taken from a fixed datum line, and the journal offset and angle can be accurately held.

Another advantage of the present invention is that the one piece bit body construction eliminates the 120° milling of the leg seams along with the welding thereof.

Still another advantage of the present invention is that the separate journal pins can be easily machined and carburized. Moreover, the one piece bit body can be cast or forged.

The journal pins can be secured to the legs by means of high energy beam welding processes. Similarly, the cone retention members can also be secured to the journal pins by these same means. As a result, the entire assembly and manufacture of the rock bits of the present invention can be accomplished simply and economically.

The features of the present invention, which are believed to be novel, are set forth with particularity in the appended claims. The present invention, both as to its organization and manner of operation, together with the further advantages thereof, may best be understood by reference to the following description taken in connection with the accompanying drawings.

DESCRIPTION OF THE PREFERRED EMBODIMENTS

Figure 1:
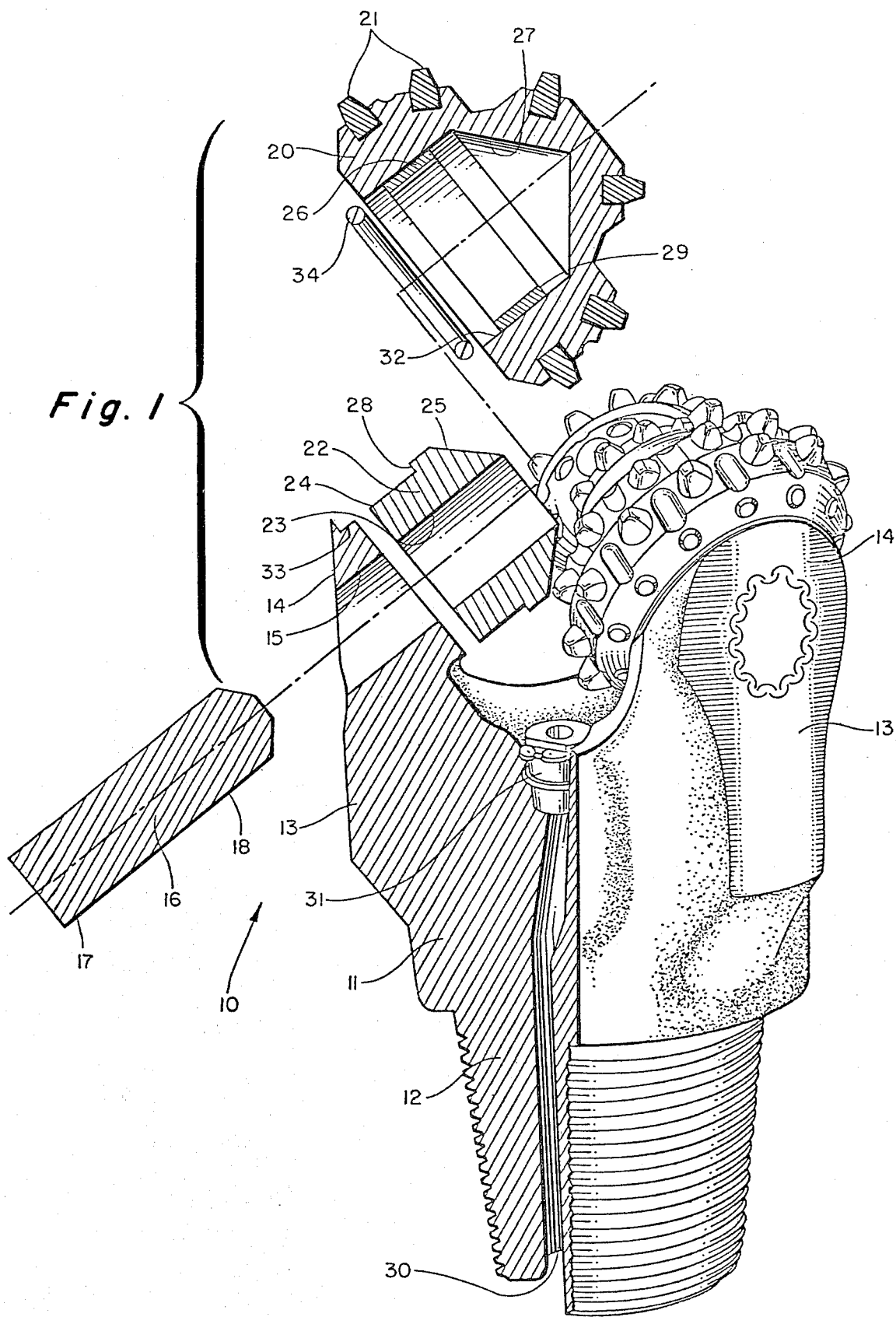
FIG. 1 is a perspective view of a three cone rotary rock bit, partially in section and exploded, to show the interior structure of the cone and leg assemblies.

Referring now to the drawings, FIG. 1 illustrates three cone rotary rock bit, generally indicated by arrow 10, having a one piece bit body 11 adapted to rotate about a central axis. Said bit body 11 includes an upper threaded pin portion 12 for connection to the lower end of a drill string (not shown). Three substantially identical legs 13 form the lower extremity of the bit body 11. These legs 13 are equidistantly spaced, 120° apart, around the circumference of the bit body 11. Each leg 13 includes an outer shirttail portion 14 forming the external annular gage surface of the bit. Each shirttail portion includes a bore 15 extending inwardly therefrom. Each bore 15 extends completely through the leg 13 and is adapted to receive a separate journal pin 16. Each journal pin 16 includes a mounting portion 17 and a bearing portion 18. Each mounting portion 17 is adapted to remain within the bore 15 while each bearing portion 18 is adapted to extend downwardly and inwardly toward the center axis of the bit body 11.

Three rotary cone cutters 20 are adapted to be rotatively supported on the bearing portions 18 of the journal pins 16. Each of the cone cutters 20 includes a cutting structure 21 on its outer face which is adapted to disintegrate the earth formation as the bit is rotated within a bore hole. The cutting structure is shown in the form of tungsten carbide inserts; however, it is to be understood that other cutting structures, such as milled steel teeth with or without hard metal, may be formed on the cone cutters. Each cutter 20 further includes a retaining ring 26 which is adapted to be secured to the interior thereof in a manner described hereinafter.

The rock bit 10 further includes an annular thrust member 22 having an inner cylindrical bearing surface 23 adapted to extend over the bearing portion 18 of each journal pin 16. Each thrust member 22 includes an outer cylindrical bearing surface 24 and a frusto-conical bearing surface 25 which are adapted to frictionally engage mating interior portions 26 and 27 respectively, of the cutter 20. The cylindrical bearing surface 24 functions to transmit the radial loads passing from the cutter 20 to the journal pin 16 while the bearing surface 25 functions to transmit a portion of the out-thrust load passing therethrough.

Each thrust member 22 also includes flanged surface 28 which is adapted to engage the inner shoulder 29 of the ring 26 to transmit the in-thrust load passing therethrough. This engagement also functions as the means for retaining the cutter 20 onto the journal pin 16, and it has been found that these means have eight times the in-thrust capacity of ball bearings, the conventional means for retaining cutters on journals.

The bit 10 further includes a central passageway 30 extending along the central axis of bit body 11 to allow drilling fluid to enter from the drill string immediately above and pass downwardly through a plurality of jet nozzles 31, one of which is shown in FIG. 1.

The base of each cutter 20 further includes a cavity 32 which cooperates with a raised portion 33 of each leg 13 to form an annular compartment for housing a resilient seal 34. Although not shown since it does not form part of the invention, a self-contained lubrication system is formed within the bit body 11 with passages being provided in each leg 13 and journal pin 16 to communicate with the interior interengaging bearing surfaces 24, 25 and 26, 27, respectively.

ASSEMBLY

In assembling the rotary rock bit 10, a thrust member 22 is positioned within the interior of each cone cutter 20. The ring 26 is then positioned within each cutter 20 behind the thrust member 22 until the shoulder 29 abuts the flanged surface 28 of the thrust member 22. Each ring 26 is then welded to the interior of a cutter 22, preferably through an electron beam welding process, to form subassemblies of the thrust members 22 rotationally mounted with the cutters 20. After the seals 34 are positioned within the openings 32 at the base of each cutter 20, the subassemblies are positioned within the legs 13 in their operative position. In this position each thrust element 22 abuts the projection 33 of each respective leg 13 and each of its bores 23 aligns itself with the bore 15 of the leg 13. The journal pins 16 are then inserted through the bores 15 until its lower end extends completely through the thrust element 22 and engages the interior bearing surface 27 of the cone 20. It should be noted that during assembly, each leg 13 also includes an additional mass of metal 35, shown in phantom in FIG. 2.

Figure 2:
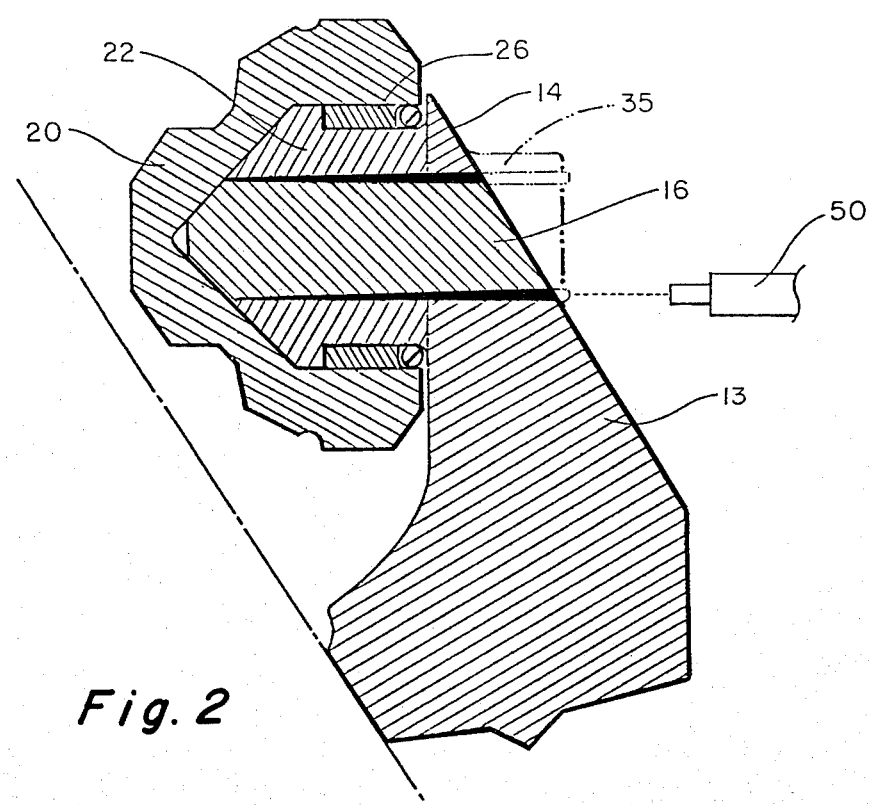
FIG. 2 is a sectional view of one leg of the rock bit of FIG. 1.

The cones, journal pins and thrust bearings are now in position for final assembly. At this point an electron beam welder, of which the gun 50 is shown in FIG. 2, is utilized to transmit a high energy beam across the mating surfaces of each journal pin 16 and leg 13. This high energy beam also extends further along each journal pin 16 in order to fuse the mating surface 18 of the journal pin 16 with the surface 23 of the thrust member 22. As a result, a single weld functions to secure the thrust member 22 to the journal pin 16. Afterwards, the excess material 35 and the end of the journal pin 16 extending beyond the shirttail 14 are removed by a milling machine until the surface is flush with the shirttail 14, as shown in FIG. 1. An advantage of the additional mass 35 shown in FIG. 2 is that the depth of the weld around the journal pin remains the same, thereby eliminating the need to vary the power to the gun 50.

OPERATION

In operation the drill bit 10 is connected to the lowermost member of a rotary drill string, not shown, and lowered into a well bore until their cutters 20 contact the bottom of the well bore. The drill string is then rotated, rotating the rock bit 10 therewith. Drilling fluid is pumped down through the interior passage of the drill string and continues through the central passageway 30 of the bit 10, passing through the nozzles 31 and past the cutting structure 21 of the cutters 20 to the bottom of the well bore. The fluid then passes across the face of the bore hole and upwardly into the annulus between the drill string and the wall of the well bore, carrying with it the cuttings and debris from the drilling operation.

Figure 3:
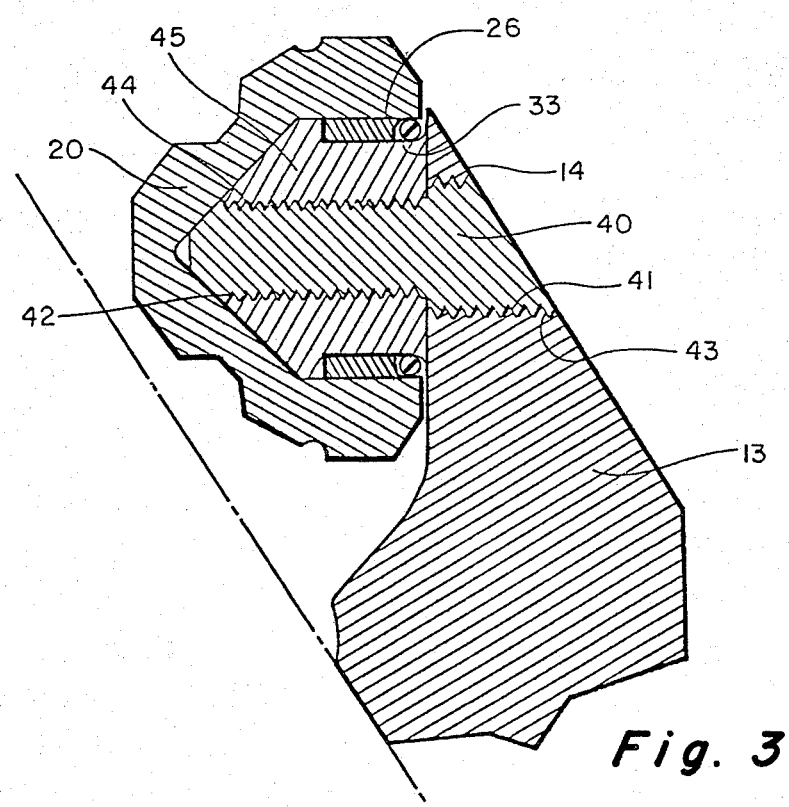
FIG. 3 is a fragmentary sectional view of the rock bit leg illustrating a second embodiment of the present invention.

Referring now to FIG. 3, a second embodiment of the invention is shown in which the cone cutters 20 are similar in construction to those shown in FIGS. 1 and 2. The only structural difference shown is that the journal pin 40 includes a pair of threaded portions 41, 42 which are adapted to be respectively threaded into a threaded bore 43 formed in the leg 13 and a smaller threaded bore 44 formed in the thrust member 45.

In assembly each thrust member 45 is positioned within the interior of a cutter 20. After the ring 26 is welded as before, each subassembly is placed in its operative position, i.e., abutting the projected portion 33 of the thrust member 45. A journal pin 40 is then inserted from the shirttail portion 14 of each leg 13 and is threaded into the threaded portion of the thrust element 45 while simultaneously being threaded to the leg 13. If desired, the outer extension of the journal pin 40 can be welded to the leg 13 along the surface of the shirttail 14 by conventional welding techniques to lock the assembly in place.

Figure 4:
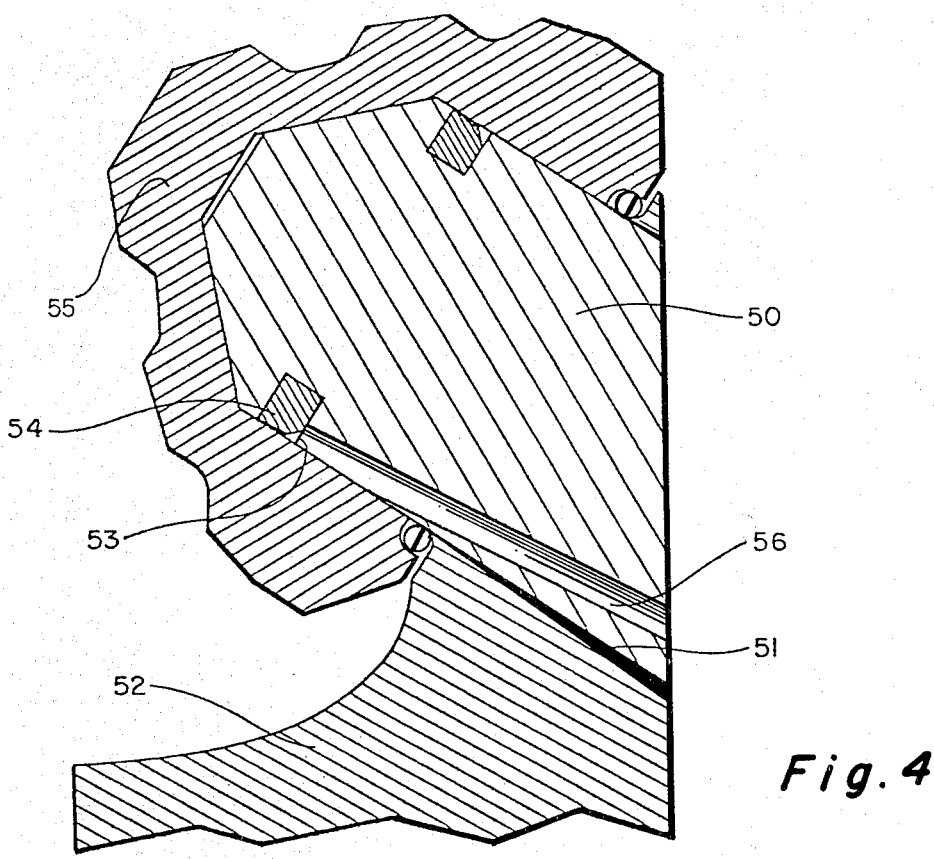
FIG. 4 is a fragmentary sectional view of a rock bit leg illustrating a third embodiment of the present invention.

Referring now to FIG. 4, a third embodiment is shown which lends itself to a one piece bit body construction and method of assembly. In this embodiment, a journal pin 50 is adapted to extend through a bore 51 of each leg 52. Each journal pin 50 further includes an annular groove 53 for receiving a two piece thrust member 54. A cone cutter 55 is adapted to extend over each journal pin 50 to be rotatively mounted thereon. Finally, an access hole 56 is provided within each journal pin 50 to provide an optical path from the exterior of the bit 10 to the engaging surfaces of the thrust member 55 and the cutter 55.

In assembly, each cutter 55 is positioned within the legs 52 similar to that shown in FIG. 1. A journal pin 50 with the two piece thrust member 54 within the groove 53 is then inserted through each bore 51 until the end of the pin engages the interior of the cutter 55 and its other end is flush with the outer surface of the leg 52. Each journal pin 50 is then secured to a respective leg 52 by a high energy beam welding process similar to that shown previously. After each journal pin 50 is secured to a leg 52, a high energy beam is directed through the access hole 56 to fuse the interengaging surfaces of the split ring thrust member 54 and the cutter 55. After the initial weld is made, and each thrust member 54 is secured to a cutter 55, each cutter 55 is rotated along with the thrust member 54 to allow the beam welder to weld completely around the annulus of the thrust member 54.

Figure 5:
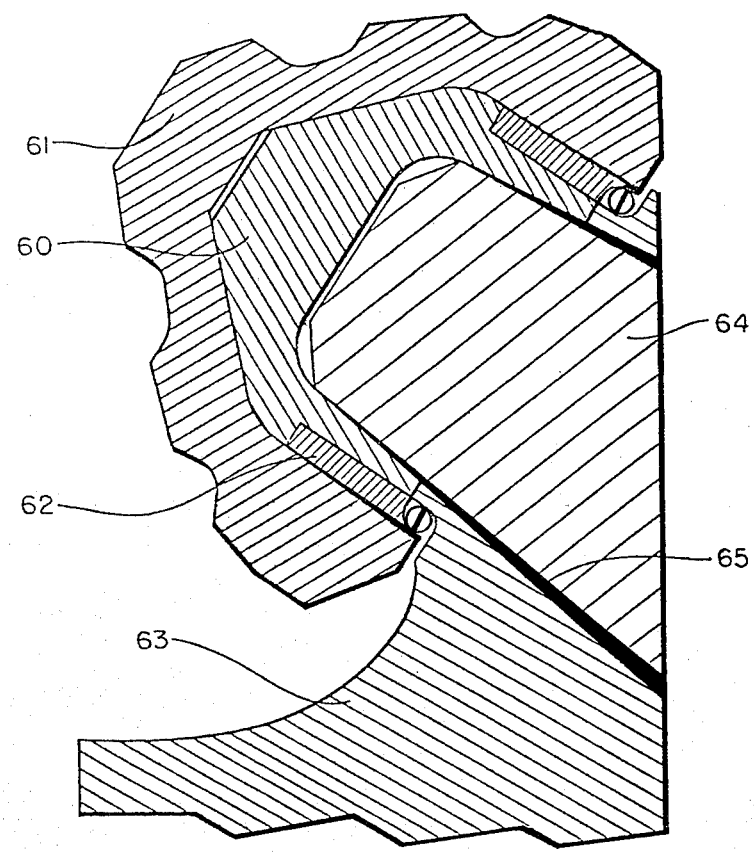
FIG. 5 is a fragmentary sectional view of a rock bit leg illustrating a fourth embodiment of the present invention.

FIG. 5 shows a fourth embodiment of the present invention which is similar to the first embodiment. In this embodiment each thrust member 60 is rotatively secured within the cavity of a cutter 61 and retained therein by a ring member 62 which is welded to the cutter 61. Each subassembly is positioned within the legs 63 as shown in FIG. 1. A journal pin 64 is then inserted through a bore 65 to extend within each thrust member 60. The difference between this embodiment and that shown in FIG. 1 is that the end of the thrust member 60 is solid whereas the thrust member 22 has the inner bearing surface 23 extending completely through the member. A single, continuous electron beam weld is then made to secure each journal pin 64 to a leg 63 and each thrust member 60 to a respective journal pin 64.

It should be noted that various modifications can be made to the assembly while still remaining within the purview of the following claims.

What is claimed is:

1. A method of manufacturing a rotary rock bit comprising the steps of:
    forming a one piece bit body having an external annular gage surface and a central axis, said bit body further having at least two legs extending downwardly from the rest of the bit body substantially parallel to said central axis along the gage surface, said legs forming an open area therebetween, below the rest of the bit body;
    drilling a bore through each leg;
    providing a cone type cutter for each leg, each cutter having an interior cavity;
    positioning each cone cutter within said open area such that the cavity of each cutter is aligned with the bore of a respective leg;
    inserting a separate journal pin through the bore of each leg from the external side thereof until a portion of each journal pin extends into the cavity of the registering cone cutter;
    providing at least two thrust elements having central bores, each thrust element cooperating with their respective journal pin to retain the cone cutter on the journal pin;
    positioning each thrust member into the cavity of each cone cutter and retaining it therein to form subassemblies;
    forming an annular shoulder on each thrust member, providing an annular member to engage the shoulder of each thrust member after it is positioned within the cavity of each cone cutter, and securing each annular member to the respective cone cutter; and
    securing each journal pin to the bore of the respective leg.

2. The method of claim 1 wherein the step of securing each journal pin to a respective leg comprises the step of projecting a high energy beam along the mating surfaces of the leg bore and the journal pin to fuse the surfaces together.

3. The method of claim 1 wherein the step of securing each journal pin to a respective leg comprises the steps of forming interengaging threads on each journal pin and the bore of each leg and threading each journal pin into the threaded bore of a respective leg.

4. The method of claim 1 further comprising the steps of aligning the bore of each thrust member with a bore of a respective leg when the subassemblies are positioned within said open area, inserting the portion of each journal pin extending into the cavity of a respective cone cutter into the bore of the thrust member, and securing each journal pin to the registering thrust element.

5. The method of claim 4 wherein the step of securing each journal pin to the registering thrust element comprises the step of projecting a high energy beam along the mating surfaces of the thrust element and the journal pin to fuse the surfaces together.

6. The method of claim 4 wherein the step of securing each journal pin to the registering thrust element comprises the steps of forming interengaging threads on each journal pin and the bore of each thrust member and threading each journal pin into the threaded bore of the respective thrust member.

7. The method of claim 5 wherein the bore of each leg is the same diameter as the bore of the respective thrust member, and a single high energy beam extends from the exterior of the leg to simultaneously fuse the journal pin to the mating surfaces of the leg bore and the thrust element bore.

8. The method of claim 2 wherein each journal pin has an end face perpendicular to the journal axis and which extends out of the external surface of the respective leg when in its operative position, and each leg has a raised portion with respect to the remaining external surface to engage the extended portion of the journal pin, including the additional step of removing the extended portion of each journal pin and the raised portion of each leg until those surfaces are flush with the external surface of the leg.

9. The method of claim 1 wherein the step of securing the annular member to the cone cutter comprises the step of projecting a high energy beam along the mating surfaces of the annular member and the cone cutter to fuse the surfaces together.

10. The method of claim 1 further comprising the steps of forming an annular groove on each journal pin, positioning one of said thrust elements within each groove, each thrust element having an outer surface for engaging the interior surface of the cutter cone, forming an access aperture in each journal pin to provide a line of sight from the exterior side of the leg to the mating surfaces of the thrust element and the cone cutter and projecting a high energy beam through each aperture to fuse the mating surfaces together.

* * * * *